United States Patent [19]
Turpin

[11] 3,936,852
[45] Feb. 3, 1976

[54] CAMERA WITH A DEVICE FOR DIRECTING SUPPLEMENTARY LIGHT INTO THE IMAGING LENS

[76] Inventor: Gerald Leslie Turpin, Knoll Cottage, Fulmer Road, Fulmer, England

[22] Filed: Oct. 22, 1974

[21] Appl. No.: 517,059

[52] U.S. Cl. ................................. 354/295; 355/71
[51] Int. Cl.² ......................................... G03B 11/00
[58] Field of Search ................. 355/67, 71; 354/295

[56] References Cited
UNITED STATES PATENTS

| | | | |
|---|---|---|---|
| 2,855,823 | 10/1958 | Klaus | 355/67 |
| 3,827,071 | 7/1974 | Turpin | 355/71 |

*Primary Examiner*—R. L. Moses
*Attorney, Agent, or Firm*—Cushman, Darby & Cushman

[57] ABSTRACT

A camera having a device for directing additional coloured light into the imaging lens thereof including a light source, a concavely curved coloured reflector, a coloured filter, a magnifying lens and a concavely curved reflector, the latter being disposed in front of the imaging lens to direct a uniform beam of coloured light into the imaging lens.

6 Claims, 4 Drawing Figures

CAMERA WITH A DEVICE FOR DIRECTING SUPPLEMENTARY LIGHT INTO THE IMAGING LENS

BACKGROUND OF THE INVENTION

1. Field of the Invention

This invention relates to cameras.

2. Description of the Prior Art

My U.S. Pat. No. 3,827,071 discloses a camera having an imaging lens for directing light from a scene to be recorded onto a light sensitive film within the camera, a housing disposed in front of the imaging lens and having an opening to permit light from the field of vision of the lens to reach the lens, an electric light source disposed in the housing outside of the field of vision of the lens, a transparent reflector mounted in the housing in a position in front of the lens such that light from the light source is reflected by the reflector through the lens while light from the scene being photographed passes through the reflector to the lens and a coloured filter between said light source and reflector to colour the light directed onto the reflector.

The reflector is a sheet of plate glass mounted obliquely to the path of light from the field of vision into the lens to reflect light from said source into the lens. With this arrangement the filter may have to be of substantial size particularly for wide angle lenses and it is an object of the present invention to provide an arrangement in which smaller filters can be used thus keeping the dimensions of the housing as compact as possible.

SUMMARY OF THE INVENTION

A camera having an imaging lens for directing light from a scene to be recorded onto a light sensitive film within the camera, a housing disposed in front of the imaging lens and having an opening to permit light from the field of vision of the lens to reach the lens, an electric light source disposed in the housing outside of the field of vision of the lens, a transparent reflector mounted in the housing in a position in front of the lens such that light from the source is reflected by the reflector through the lens while the light from the scene being photographed passes through the reflector to the lens and at least one coloured filter disposed between the light source and reflector to colour the light directed thereto, wherein the improvement comprises forming the reflector from a curved transparent sheet having a concave reflector surface facing the filter and imaging lens to direct light from the former into the latter.

DESCRIPTION OF THE PREFERRED EMBODIMENTS

Figure 1:
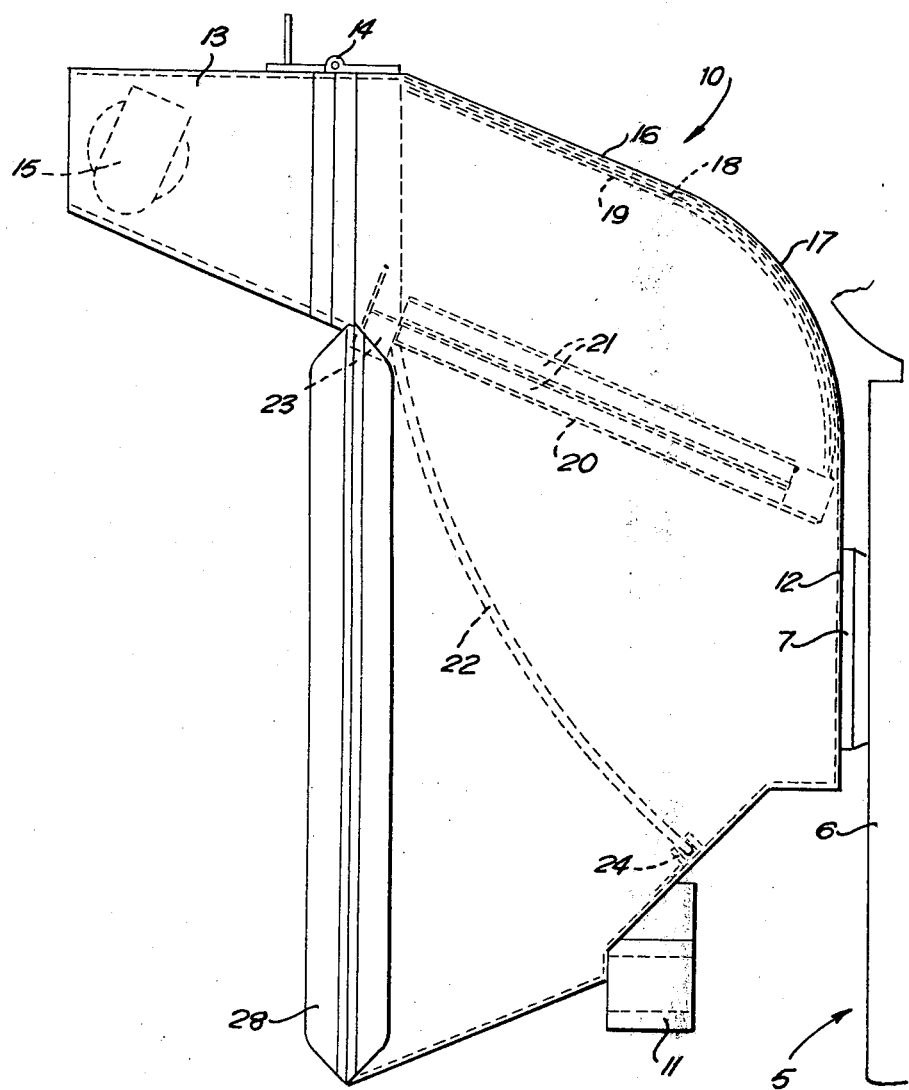
FIG. 1 is a side view of a device for mounting on the front of a camera.

Referring firstly to FIG. 1 of the drawings there is shown a device for mounting on the front of a camera comprising a hood like housing 10 formed with mounting bosses 11 (only one of which can be seen) for securing the housing to the camera body 6. The rear wall of the housing 10 has an aperture 12 intended to register with the main lens aperture 7 of the camera to which the housing is secured. A lamp housing 13 is hinged at 14 to the top of the housing 10 at the front thereof and contains a 1,250 watt lamp 15. A control (not shown) is provided for adjusting the power supplied to the lamp. The detailed construction of the lamp housing will be described later.

The top wall of the housing 10 extends downwardly from the forward end thereof at an angle of 22° as indicated at 16 and the rearward part of the top wall is smoothly curved as indicated at 17 to meet the back wall of the housing. Channels 18 extend along either side of the top wall following the contour of the wall in which a reflector card 19 of a selected colour is supported.

The card thereby has a flat part nearest lamp 15 and lying obliquely to the light path from the lamp and a concavely curved part extending downwardly therefrom which together reflect downwardly from the lamp a coloured beam of light which is concentrated towards the rear of the housing for a purpose described below.

Above the aperture 12 in the rear wall of the housing holders 20 for coloured filters 21 are mounted on the walls of the housing. The filters further colour the light reflected downwardly from the coloured card 19.

A parallel sided reflector 22 formed from clear acrylic plastics which is curved in one plane only extends obliquely down the housing. The upper end of the reflector 22 engages in a recess 23 in the underside of the lowermost filter holder 20 at the end thereof adjacent to front of the housing and the lower end of the reflector 22 is received in a channel 24 secured to the bottom wall of the housing adjacent the aperture 12. The concave reflector surface of the reflector is directed both towards the filters 21 and the aperture 12 so that light transmitted by the filters is directed by the reflector into the aperture 12. The convex surface of the reflector 22 is directed toward the field of vision of the aperture 12 and the reflector is optically perfect so that no distortion of the light transmitted by the reflector 22 from the field of vision into the aperture 12 occurs. Thus a coloured light determined by the colour of the card 19 and the filters 21 and of an intensity determined by the power supplied to the lamp 15 is directed into the camera aperture to supplement the light received from the field of vision. The colour and intensity of the light are determined in a similar manner to that described in U.S. Pat. No. 3,827,071.

The curved reflector 22 permits relatively short filters 21 to be used for directing light into the camera lens even for wide angle lenses compared with the flat glass filter described in U.S. Pat. No. 3,827,071. The concentration of light from the reflector 19 towards the rear of the housing results in a greater illumination of the filters 21 adjacent the rear of the housing than adjacent the front of the housing. This compensates for the reduction in illumination at the reflector adjacent the rear of the housing because of the greater distance of the filter from the reflector adjacent the rear of the housing compared with the front of the housing. As a result the light beam entering the aperture of the camera is of uniform concentration across the aperture.

Figure 2:
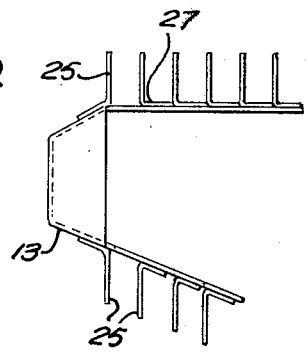
FIG. 2 is a side view of a lamp housing of the device.
Figure 3:
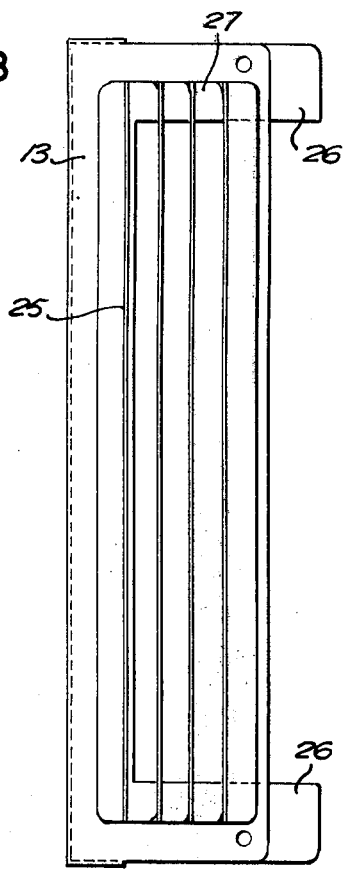
FIG. 3 is a plan view of the lamp housing.

The lamp housing 13 is shown in greater detail in FIGS. 2 and 3 to which reference will now be made. The housing 13 is open along its upper and lower faces and fins 25 extend along the upper and lower faces of the housing to assist in dissipating heat from the housing. The fins 25 are secured to flanges 26 extending along the upper and lower side walls of the housing by lugs 27 formed at both ends of each fin.

The side edges of the front of the housing 10 have hinged flaps 28 which are intended to prevent extraneous light reaching the reflector 22. The flaps can be opened or closed as desired.

Figure 4:
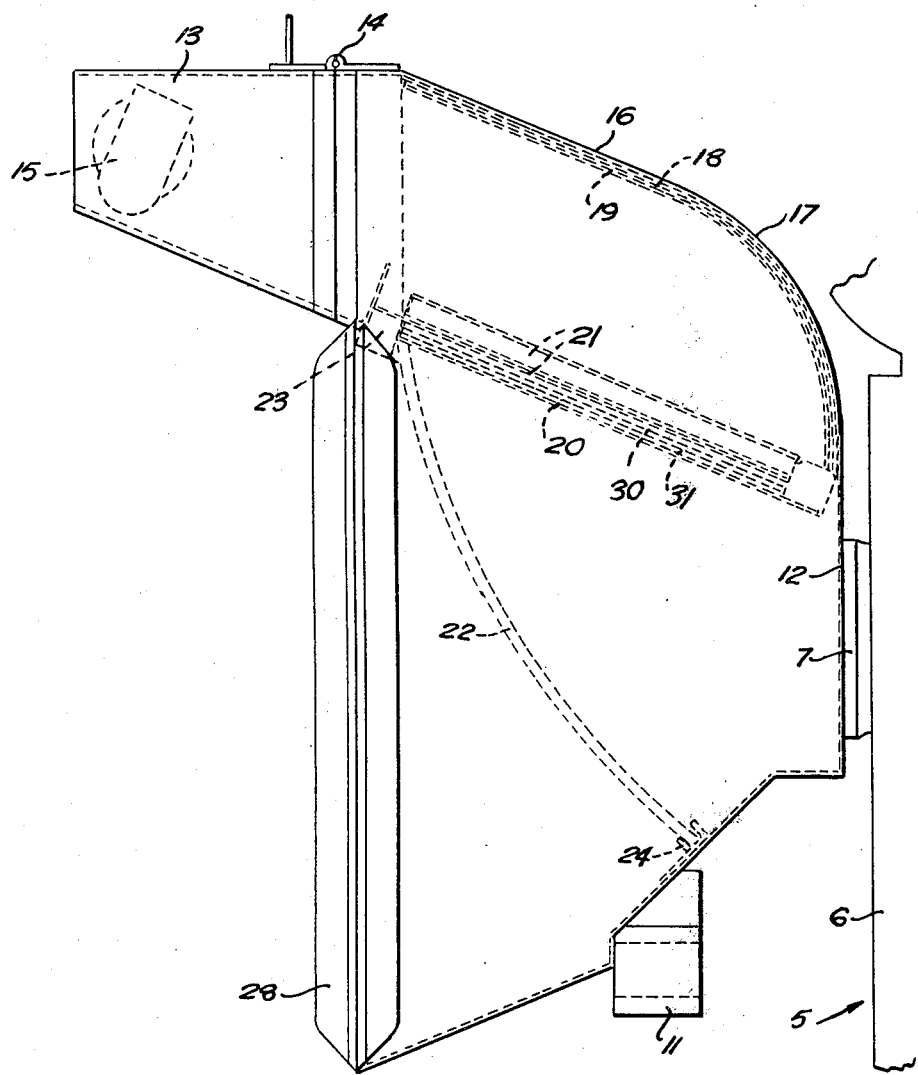
FIG. 4 is a similar view to FIG. 1 showing a modified construction of the device.

FIG. 4 shows a modification to the device of FIGS. 1 to 3 in which a rectangular "Fresnel" type lens 30 is located immediately below the filters 21. The lens 30 directs a magnified image of a central portion of the coloured card reflector 19 onto the reflector 22 to be directed into the camera aperture thereby eliminating the side edges of the card reflector 19 from the image directed into the camera aperture. The Fresnel lens 30 has a ridged surface and if the ridges of the surface can be seen in the image directed into the camera aperture, these are suppressed by a translucent screen 31 located immediately below the lens 30. In an alternative construction to the above, the Fresnel lens may be replaced by a conventional magnifying lens which may be located above or below the filters 21.

In a further modification a light meter may be mounted externally of the housing 10 with a photoelectric cell of the meter located within the housing on the front or bottom wall thereof to face the reflector 22 without being visible in the camera aperture. The meter thus measures the light directed from the reflector 22 into the camera aperture so that the power supplied to the lamp 15 can be adjusted in accordance with the level of light of the scene being photographed.

In a still further modification applicable to any of the above constructions, the reflector 22 of the device may be curved in two mutually perpendicular planes so that the width of the filters can also be reduced, enabling the housing 10 to be reduced in size.

I claim:

1. A camera having an imaging lens for directing light from a scene to be recorded onto a light sensitive film within the camera, a housing disposed in front of the imaging lens and having an opening to permit light from the field of vision of the lens to reach the lens, an electric light source disposed in the housing outside of the field of vision of the lens, a transparent reflector mounted in the housing in a position in front of the lens such that light from the source is reflected by the reflector through the lens while the light from the scene being photographed passes through the reflector to the lens and at least one coloured filter disposed between the light source and reflector to colour the light directed thereto, wherein the improvement comprises a reflector formed from a curved transparent sheet having a concave reflector surface facing the filter and imaging lens to direct light from the former into the latter and wherein the reflector is formed from clear acrylic plastic.

2. A camera as claimed in claim 1 wherein reflector is curved in one plane only.

3. A camera as claimed in claim 1 wherein the reflector is curved in two mutually normal planes.

4. A camera having an imaging lens for directing light from a scene to be recorded onto a light sensitive film within the camera, a housing disposed in front of the imaging lens and having an opening to permit light from the field of vision of the lens to reach the lens, an electric light source disposed in the housing outside of the field of vision of the lens, a transparent reflector mounted in the housing in a position in front of the lens such that light from the source is reflected by the reflector through the lens while the light from the scene being photographed passes through the reflector to the lens and at least one coloured filter disposed between the light source and reflector to colour the light directed thereto, wherein the improvement comprises a reflector formed from a curved transparent sheet having a concave reflector surface facing the filter and imaging lens to direct light from the former into the latter and wherein the curved reflector lies obliquely to the camera lens, one end of the reflector being closer to the lens than the other end, the filter extends between said other end of the reflector and a location adjacent one side of the lens, and further including a coloured light reflector spaced from the filter on the opposite side of the filter to the transparent light reflector, the coloured light reflector having a flat portion extending parallel to the filter and a concavely curved portion which converges toward the filter at the end of the filter adjacent the lens so that light from said light source is directed onto the colored reflector for reflection through the filter and subsequent reflection by the transparent reflector into the camera lens.

5. A camera as claimed in claim 4 wherein a magnifying lens is provided between the coloured reflector and the transparent reflector.

6. A camera as claimed in claim 5 wherein the magnifying lens is a Fresnel type lens.

* * * * *